US005224813A

United States Patent [19]

Nakamura et al.

[11] Patent Number: 5,224,813

[45] Date of Patent: Jul. 6, 1993

[54] APPARATUS FOR CHANGING A PLATE CYLINDER IN A WEB-FED ROTARY GRAVURE PRESS

[75] Inventors: Hiroki Nakamura, Funabashi; Toshiya Saeki, Zama; Hideyuki Arai, Zama; Sadayoshi Naito, Zama, all of Japan

[73] Assignee: Toshiba Kikai Kabushiki Kaisha, Tokyo, Japan

[21] Appl. No.: 802,134

[22] Filed: Dec. 3, 1991

[30] Foreign Application Priority Data

Sep. 1, 1989 [JP] Japan ................................ 1-227069

[51] Int. Cl.[5] ........................................... B65G 67/02

[52] U.S. Cl. ................................ 414/352; 198/345.3; 198/346.1; 414/395; 414/433; 414/416; 414/498; 414/609

[58] Field of Search ............... 414/280, 281, 352, 395, 414/390-392, 399, 400, 431-433, 416, 498, 507, 585, 609, 222; 198/345.3, 346.1, 465.1

[56] References Cited

U.S. PATENT DOCUMENTS

| | | | |
|---|---|---|---|
| 144,608 | 11/1873 | Fields | 414/507 |
| 3,250,415 | 4/1966 | Wuesthoff | 414/433 |
| 4,131,206 | 12/1978 | Kawada et al. | 414/352 |
| 4,279,559 | 7/1981 | Stumpf | 414/431 |
| 4,538,950 | 9/1985 | Shiomi et al. | 414/392 X |
| 4,626,160 | 12/1986 | Shiomi et al. | 198/345.3 X |
| 4,718,810 | 1/1988 | Hoehn et al. | 198/346.1 X |
| 4,818,171 | 4/1989 | Burkholder | 414/352 X |
| 5,143,195 | 9/1992 | Bloecker | 198/346.1 X |

FOREIGN PATENT DOCUMENTS

| | | | |
|---|---|---|---|
| 56-402 | 5/1981 | Japan | 414/280 |

*Primary Examiner*—David A. Bucci

*Attorney, Agent, or Firm*—Koda and Androlia

[57] ABSTRACT

An apparatus for changing a plate cylinder in a web-fed rotary gravure press comprises supporting mechanisms for detachably supporting both ends of a plate cylinder, a palette for carrying the plate cylinder, an elevator having a first conveying mechanism for conveying the palette in an axial direction of the plate cylinder and being vertically movable between a first position where the plate cylinder is supported by the supporting mechanism and a second position where the plate cylinder is conveyed in the axial direction by the conveying mechanism, and a truck movable in a direction perpendicular to the axial direction of the plate cylinder and having a pair of second conveying mechanisms parallel to each other for conveying the palette in the axial direction of the plate cylinder when the elevator is at the second position.

8 Claims, 8 Drawing Sheets

APPARATUS FOR CHANGING A PLATE CYLINDER IN A WEB-FED ROTARY GRAVURE PRESS

BACKGROUND OF THE INVENTION

The present invention relates to an apparatus for changing a plate cylinder in a web-fed rotary gravure press, and more particularly to an apparatus for changing a plate cylinder which can easily and quickly change a plate cylinder.

Conventionally, in a web-fed rotary gravure press, after a certain number of sheets has been printed by a plate cylinder mounted at present on a machine, the plate cylinder is replaced with a new one. The replacement work is carried out in the following manner. Workers are deployed to both sides of the plate cylinder mounted at present (hereinafter referred to as a present plate cylinder) on the machine, the present plate cylinder is removed and conveyed to a certain place. Thereafter, a new plate cylinder to be mounted (hereinafter referred to as a new plate cylinder) is placed in a predetermined position and mounted on the machine. This replacement work is carried out for every unit of an edition. This replacement work from the present plate cylinder to the new plate cylinder by workers necessitates a great deal of labor and time. Further, since the replacement work is carried out for every unit of an edition, the printing efficiency is very low. Particularly, when the lot size of material to be printed is small, the proportion of loss time to total printing time is high thus lowerin the entire efficiency of printing.

In order to eliminate the above described drawbacks, there has been proposed an apparatus for automatically changing a plate cylinder which is provided with an elevator, capable of being raised or lowered, immediately below the plate cylinder rotatably supported by a pair of supporting mechanisms. In this apparatus, the present plate cylinder is removed outside from the elevator by a conveying mechanism, the new plate cylinder is automatically mounted on the supporting mechanisms in place of the present plate cylinder.

However, in this conventional apparatus for automatically changing a plate cylinder, since the new plate cylinder is directly conveyed by the conveying mechanism, the position of the new plate cylinder in a rotational direction is displaced while it is conveyed. As a result, the position of the new plate cylinder must be readjusted before setting. Attachment of the plate cylinder to the supporting mechanism is therefore troublesome and time-consuming.

Briefly, in the case where all replacement work is carried out by workers, a great deal of labor and time is required. On the other hand, in the conventional apparatus for automatically changing a plate cylinder, since the conveying work of the new plate cylinder cannot be performed without displacement of the plate cylinder, the replacement work of the plate cylinder is troublesome and time-consuming.

SUMMARY OF THE INVENTION

It is therefore an object of the present invention to provide an apparatus for changing a plate cylinder in a web-fed rotary gravure press in which a plate cylinder can be quickly and accurately conveyed and can be easily and reliably changed.

According to the present invention, there is provided an apparatus for changing a plate cylinder in a web-fed rotary gravure press comprising: supporting mechanisms for detachably supporting both ends of the plate cylinder, the supporting mechanisms provided in confrontation with each other; a pallet for carrying the plate cylinder; an elevator provided below the supporting mechanisms and having a first conveying mechanism for conveying the pallet in the axial direction of the plate cylinder, the elevator vertically movable between a first position where the plate cylinder is supported by the supporting mechanisms and a second position where the plate cylinder is conveyed in the axial direction by the conveying mechanism; and a truck provided adjacent to the elevator and movable in a direction perpendicular to the axial direction, the truck having a pair of second conveying mechanisms parallel to each other for conveying the pallet in the axial direction when the elevator is located at the second position.

With the above construction, a present plate cylinder which is supported by the supporting mechanisms is placed on the pallet on the elevator located at the first position, and then the elevator is lowered to the second position, and the pallet placing thereon the present plate cylinder is conveyed from the first conveying mechanism of the elevator to one of the second mechanisms of the truck. Thereafter, the truck is moved in a direction perpendicular to the axis of the present plate cylinder; a new plate cylinder placed in advance on the pallet on another conveying mechanism of the truck is then conveyed onto the elevator together with the pallet; the elevator is elevated to the first position; and the new plate cylinder is supported at its both ends by the supporting mechanisms.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

In the drawings, FIGS. 1 through 10 show an apparatus for changing a plate cylinder in a web-fed rotary gravure press according to an embodiment of the present invention, in which:

FIG. 1 is a plan view showing a conveying mechanism in an elevator and a conveying mechanism in a truck;

FIG. 2 is an elevation taken along line II—II of FIG. 1;

FIG. 3 is an elevation taken in the direction of arrow III of FIG. 1;

FIG. 4 is an elevation taken in the direction of arrow IV of FIG. 1;

FIG. 5 is a partial sectional view taken along line V—V of FIG. 1;

FIG. 6 is a partial sectional view taken along line VI—VI of FIG. 1;

FIG. 7 is a plan view showing a pallet in the apparatus for changing a plate cylinder in a web-fed rotary gravure press of the present invention;

FIG. 8 is a view taken in the direction of arrow VIII of FIG. 7;

FIG. 9 is an elevation showing a positioning mechanism in the apparatus for changing a plate cylinder in a web-fed rotary gravure press of the present invention; and FIG. 10 is an elevation showing the supporting state of a plate cylinder in the apparatus for changing a plate cylinder in a web-fed rotary gravure press according to the present invention.

DETAILED DESCRIPTION OF THE INVENTION

Figure 1:
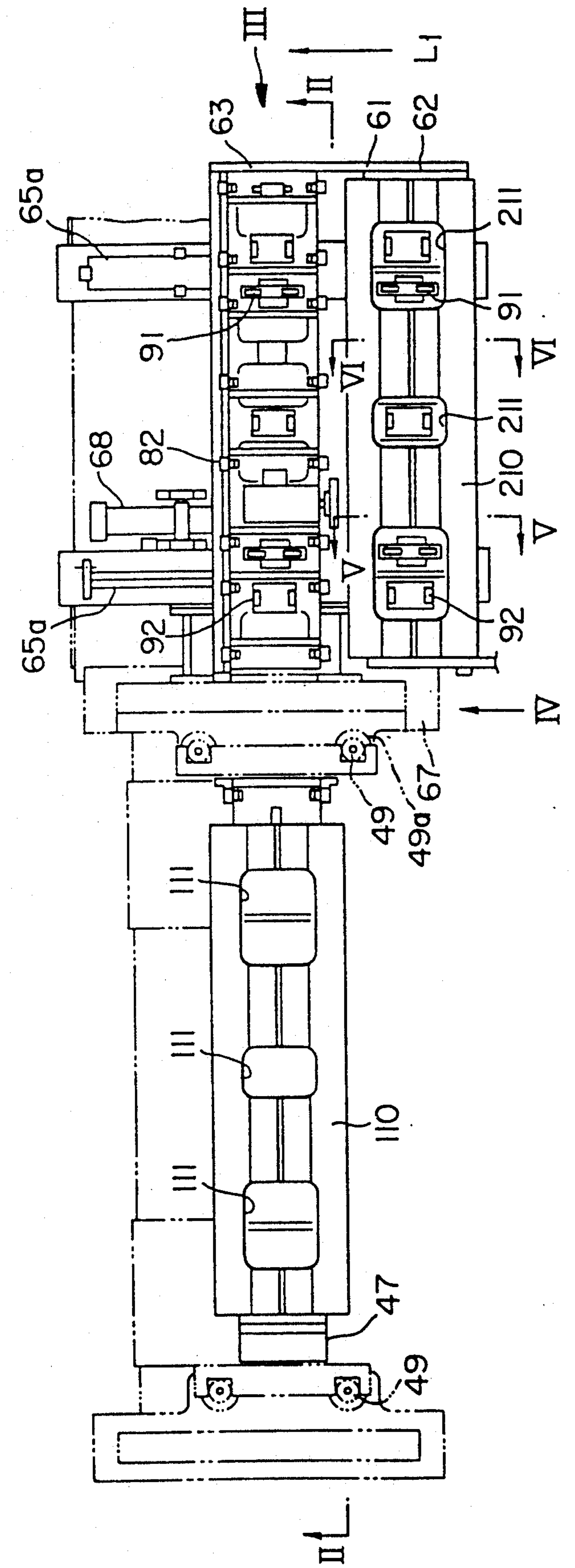
Figure 2:
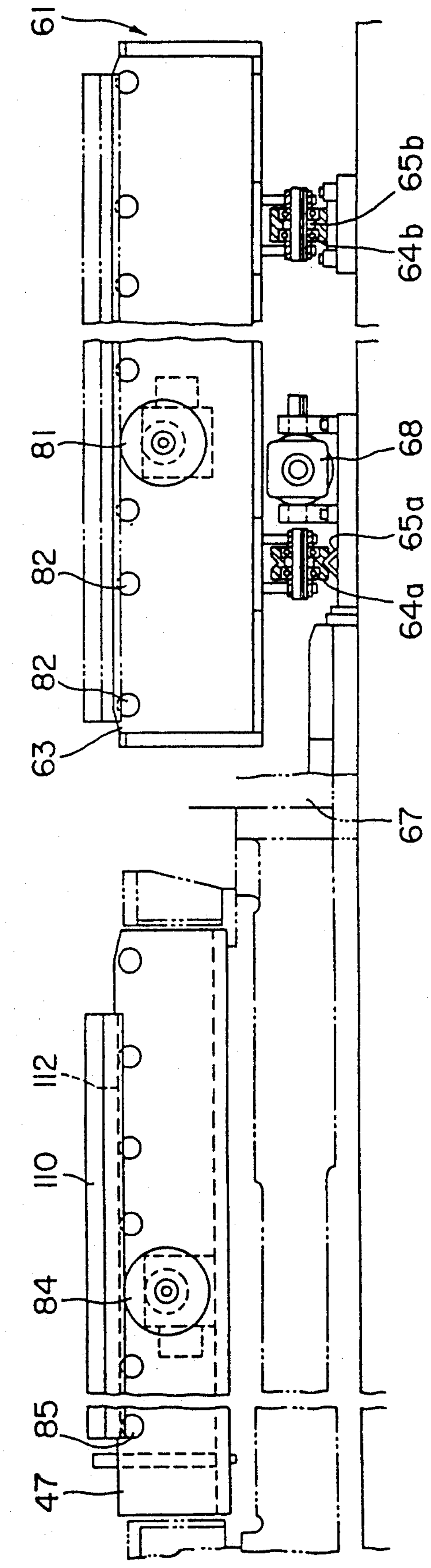
Figure 3:
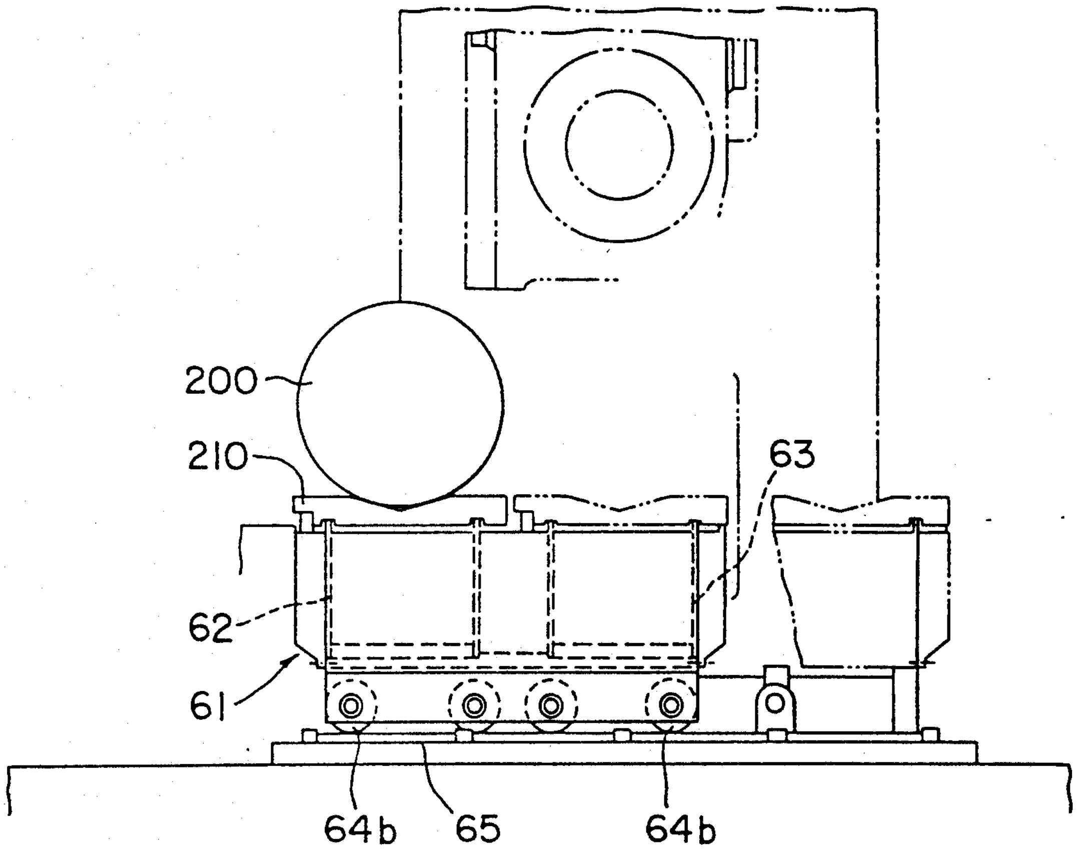
Figure 4:
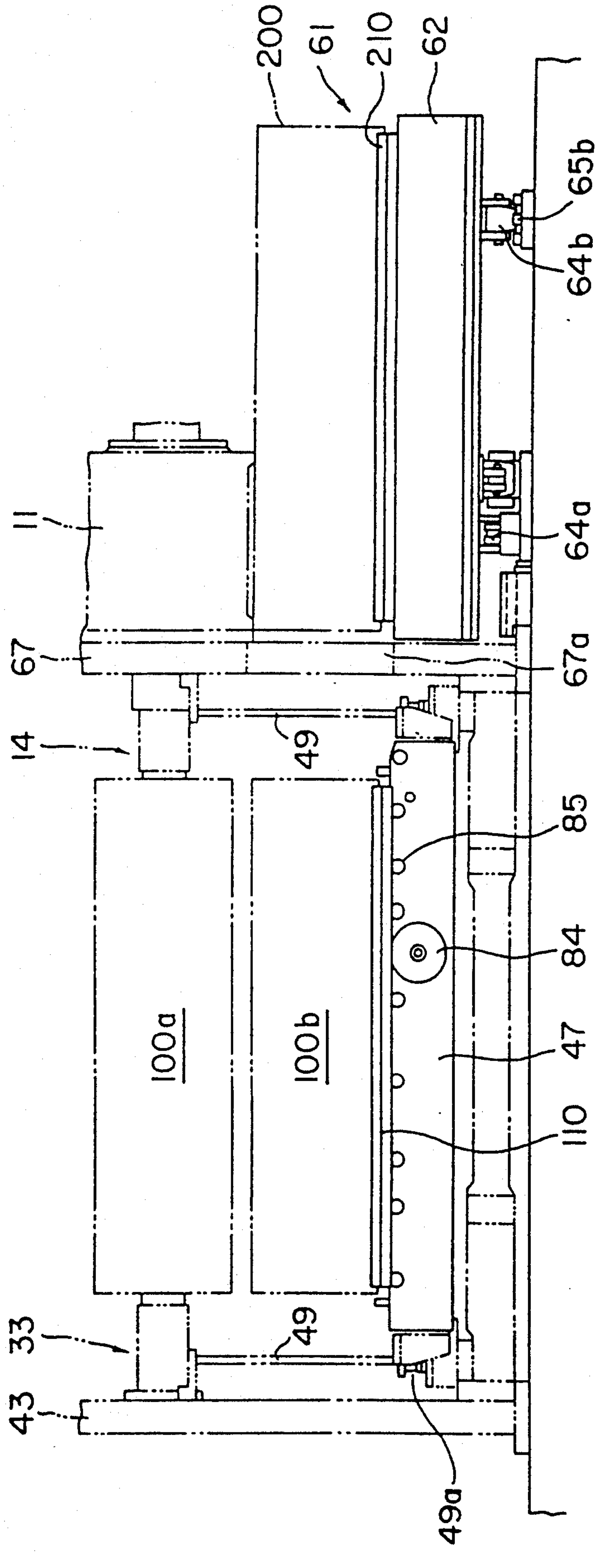

An apparatus for changing a plate cylinder in a web-fed rotary gravure press according to an embodiment of the present invention will be described below with reference to FIGS. 1 through 10.

First, a supporting state of a plate cylinder will be described with reference to FIG. 10. A present plate cylinder 100 is supported by a supporting shaft 33a of a supporting mechanism 33 on an operation side and a supporting shaft 15 of a supporting mechanism 14 on a transmission side.

The supporting mechanism 33 and the supporting mechanism 14 are supported by an operation side frame 43 and a transmission side frame 67, respectively.

Figure 10:
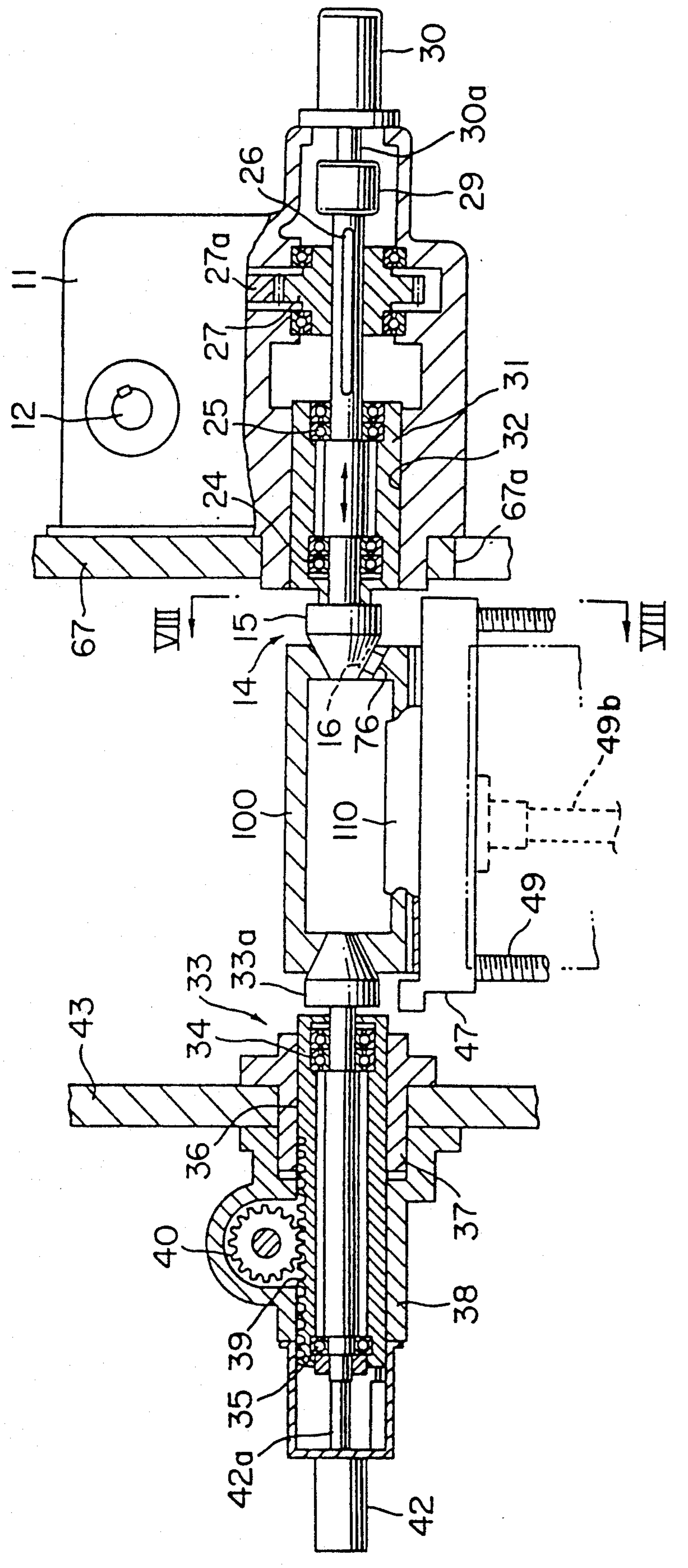

In FIG. 10, the supporting shaft 15 is rotatably supported by bearings 24 and 25. The supporting shaft 15 is rotated by a gear 27 through a sliding key 26. The gear 27 is engaged with an output gear 27a connected to a main motor (not shown in the drawing) and is driven by the output gear 27a. Further, the supporting shaft 15 is coupled to a line shaft 12 with 1:1 gear ratio, and the phase of the present plate cylinder 100 is detected from this line shaft 12.

A thrust transmission joint 29 with a built-in thrust bearing connects the right side end of the supporting shaft 15 with a piston rod 30a of an air cylinder 30. The supporting shaft 15 is reciprocally actuated by the air cylinder 30. A sleeve 31 is fitted with a hole 32 of a gear box 11. A key (not shown) is interposed between the sleeve 31 and the gear box 11 so that the sleeve 31 is not rotatable but slidable with respect to the gear box 11.

The supporting mechanism 33 has a supporting shaft 33a which is rotatably supported by bearings 34 and 35. A sleeve 36 accommodating therein the bearings 33, 34 is inserted into housings 37 and 38. A key (not shown) is interposed between the sleeve 36 and the housings 37 and 38 so that the sleeve 36 is not rotatable but slidable with respect to the housing 37 and 38. The sleeve 36 is formed, at a part of its outer periphery, with a rack 39 which is engaged with a pinion 40 driven by a servo motor (not shown). The pinion 40 serves to adjust small displacements of the sleeve 36 in the axial direction. The supporting shaft 33a has a left side end which is connected to a piston rod 42a of an air cylinder 42.

Further, an elevator 47 is provided between and immediately below the supporting mechanism 33 and the supporting mechanism 14 them as shown in FIG. 10. The elevator 47 is vertically movable by ball screws 49 and nuts 49a (FIGS. 1 and 4) provided on the elevator 47. The elevator 47 may be actuated using an air or a hydraulic cylinder 49b (FIG. 10), or a link mechanism. The elevator 47 supports a pallet 110 which is designed to place the present plate cylinder 100 fixedly at a predetermined position.

Next, the elevator and a truck in the apparatus for changing a plate cylinder will be described below with reference to FIGS. 1 through 4.

As mentioned above, the elevator 47 is provided between and immediately below the supporting mechanism 33 and the supporting mechanism 14. The elevator 47 is vertically movable between a plate cylinder supporting position (uppermost position) and a plate cylinder conveying position (lowermost position) where a plate cylinder is conveyed in a horizontal direction. FIG. 1 shows the elevator 47 which is at the plate cylinder conveying position and on which the plate cylinder is not shown for reason of illustrative convenience.

In FIG. 1, a truck 61 is disposed on the extension line of the elevator 47 and the transmission side frame 67. The truck 61 is reciprocally movable in a direction perpendicular to the axial direction of the present plate cylinder 100 and the new plate cylinder 200. The truck 61 is provided with a pair of conveying mechanisms 62 and 63, parallel to each other, for conveying the pallets 110 and 210 in the axial direction of the plate cylinders 100 and 200. The conveying mechanisms 62 and 63 have an upper surface serving as a slide-way which is at the same level as that of the elevator 47 positioned at the plate cylinder conveying position. With this structure, when the truck 61 moves, the plate cylinders 100 and 200 are conveyed on the extension line of the elevator 47 from the plate cylinder conveying position to the axial direction of the plate cylinder by the conveying mechanism 62 and 63.

The truck 61 has a lower end to which V-shaped casters 64a and flat casters 64b are attached. The V-shaped casters 64a travel on an inverse V-shaped rail 65a which is laid in a direction perpendicular to the axial direction of the plate cylinders 100 and 200. On the other hand, the flat casters 64b travel on a flat rail 65b parallel to the inverse V-shaped rail 65a. The V-shaped casters 64a are engaged with the inverse V-shaped rail 65a, thereby preventing the truck 61 from shifting in the right and left direction of FIG. 1. The truck 61 is actuated by a hydraulic cylinder 68, whereby the truck 61 is movable in a direction perpendicular to the axial direction of the plate cylinders 100 and 200.

Further, the pallet 110 is supported on the elevator 47 to carry the present plate cylinder 100, and the pallet 210 is supported on the conveying mechanism 62 to carry the new plate cylinder 200.

Figure 7:
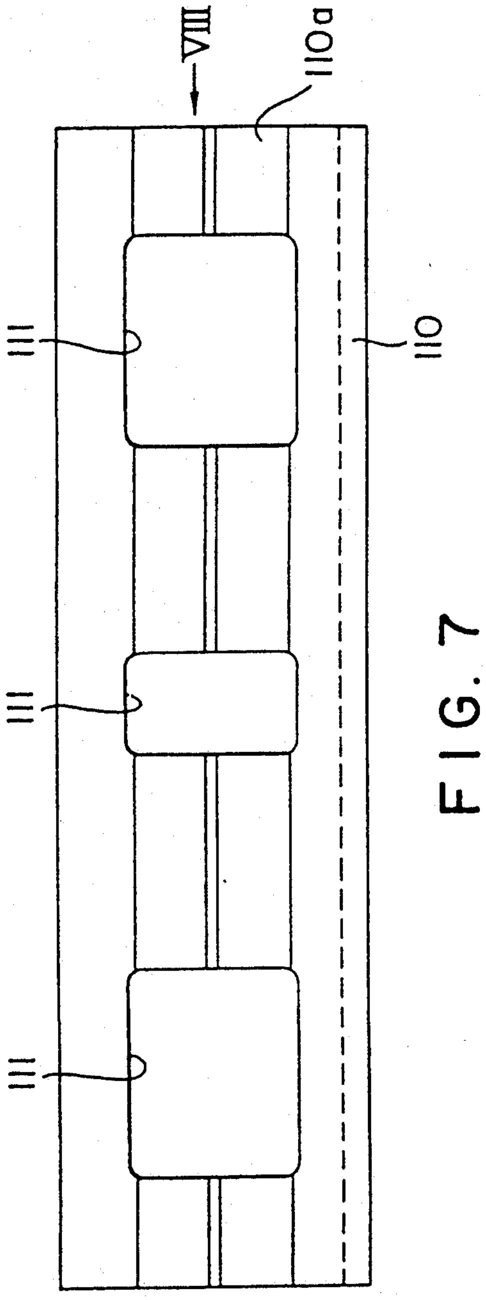
Figure 8:
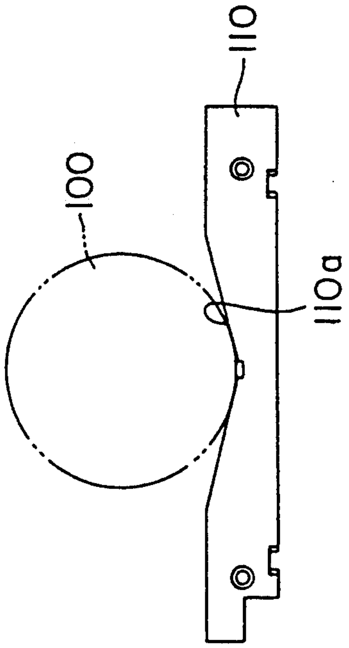

Next, one of the pallets 110 will be described in detail with reference to FIGS. 7 and 8.

The pallet 110 is in the form of a flat plate and has a recess 110a to receive the present plate cylinder 100 at an upper side thereof. That is, the present plate cylinder 100 is placed in the recess 110a, whereby the present plate cylinder 100 is fixedly supported on the pallet 110 without moving in the axial and circumferential directions thereof. The pallet 110 has a plurality of through holes 111 (three holes in the example) juxtaposed with one another. The pallet 210 has the same construction as that of the pallet 110.

On the other hand, the elevator 47 is provided with a pinion 84 which is engaged with a rack formed on the lower surface of the pallet 110, thereby moving the pallet 110 in the axial direction of the present plate cylinder 100. Guide rollers 85 are attached to the upper portion of the elevator 47 to thereby guide the pallet 110.

Further, the conveying mechanism 62 of the truck 61 is provided with a pinion 81 which is engaged with a rack formed on the lower surface of the pallet 210, thereby moving the pallet 210 in the axial direction of the new plate cylinder 200. Guide rollers 82 are attached to the upper portion of the conveying mechanism 62 to thereby guide the pallet 210.

Figure 5:
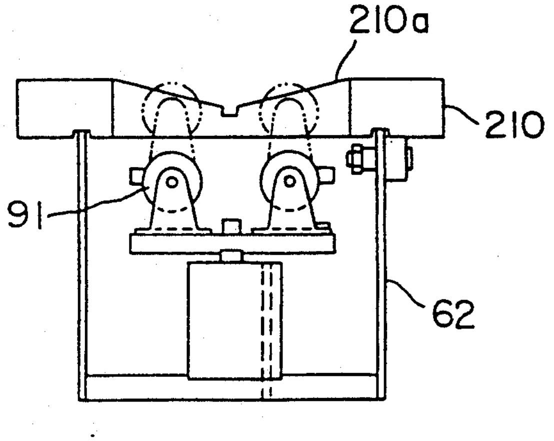
Figure 6:
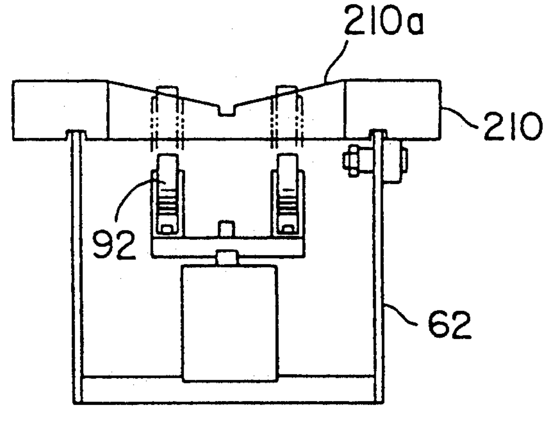

The conveying mechanism 63 of the truck 61 is provided with the pinion 81 and the guide rollers 82. The conveying mechanism 62 of the truck 61 incorporates rollers 91 and 92 which are located at the corresponding positions of the through holes 211 of the pallet 210 and extend upwardly from the through holes 211 as shown in FIGS. 5 and 6. The rollers 91 and 92 are vertically movable so as to contact the new plate cylinder 200. In this example, there are provided two pairs of the rollers 91 which contact the new plate cylinder 200 and rotate the same in the circumferential direction thereof, and there are provided three pairs of the rollers 92 which contact the new plate cylinder 200 and move the same in the axial direction thereof.

The conveying mechanism 63 also has two pairs of rollers 91 and three pairs of rollers 92 which are vertically movable.

Next, operation of the apparatus for changing a plate cylinder thus constructed will be described.

First, the pallet 210 supporting thereon the new plate cylinder 200 is disposed in a predetermined position of the conveying mechanism 62 of the truck 61, thereby preparing for the replacement work. That is, while the pallet 210 is placed on the conveying mechanism 62, the rollers 92 of the conveying mechanism 62 are elevated upward from the through holes 211 of the pallet 210 as shown in FIG. 6. In this state, the new plate cylinder 200 is placed onto the pallet 210 from a side end of the pallet 210 and disposed at a predetermined position by moving the new plate cylinder 200 in the axial direction thereof by the rollers 92. Thereafter, the roller 92 is lowered to thus place the new plate cylinder 200 on the pallet 210.

A key way 76 of the new plate cylinder 200 is aligned with the key 16. That is, the rollers 91 of the conveying mechanism 62 are elevated upwardly from the through holes 211 of the pallet 210 as shown in FIG. 5. Then the roller 91 is brought in contact with the new plate cylinder 200 and rotated. The new plate cylinder 200 is rotated in the circumferential direction thereof by the rollers 91, whereby the new plate cylinder 200 is positioned at a predetermined position of the circumferential direction.

Figure 9:
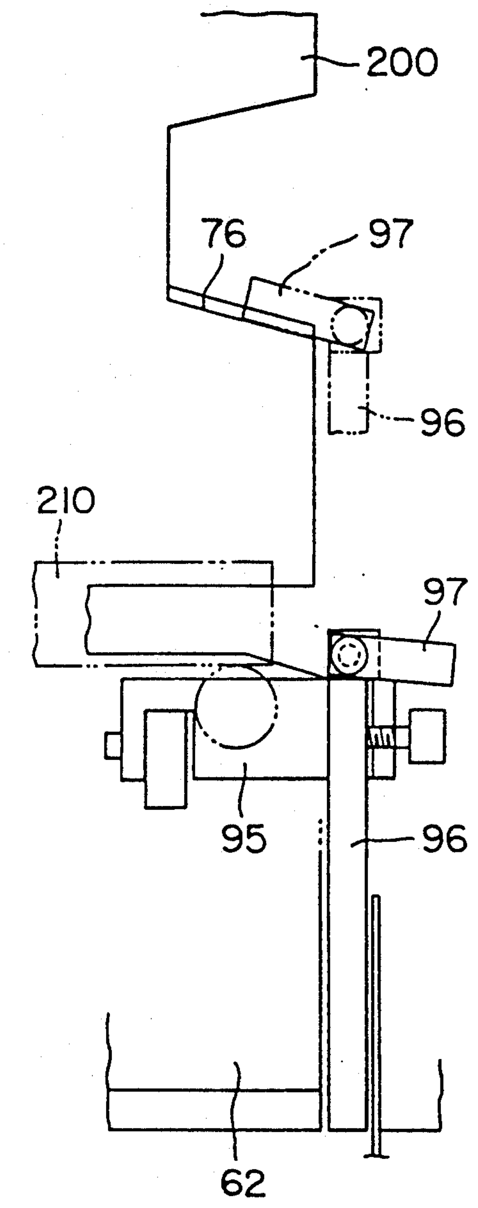

Next, alignment of the new plate cylinder is carried out by means of an alignment mechanism. In FIG. 9, a bracket 95 is fixedly secured to the conveying mechanism 62. A vertical rod 96 is vertically slidably supported by the bracket 95. The vertical rod 96 has an upper end on which a lever 97 is rotatably provided.

In FIG. 9, when the new plate cylinder 200 is placed at a predetermined position in the circumferential direction by rotation of the rollers 91, the vertical rod 96 is lifted upwardly and the lever 97 is rotated to thereby fit the vertical rod 96 into the key way 76 of the new plate cylinder 200. In this operation, the plate cylinder 200 is positioned in the circumferential direction thereof. Incidentally, the alignment mechanism as shown in FIG. 9 is provided on the conveying mechanism 63 of the truck 61 as well.

After the positioning of the new plate cylinder 200, the rollers 91 are lowered to thereby place the new plate cylinder 200 on the pallet 210. The new plate cylinder 200 placed on the pallet 210 is stably supported by the recess 210a having a tapered surface so that the position of the new plate cylinder 200 does not shift.

At this stage, the present plate cylinder 100 is supported by the supporting shaft 33a of the supporting mechanism 33 and the supporting shaft 15 of the supporting mechanism 14. Further, the elevator 47 carries the pallet 110 and is positioned at the plate conveying position.

Next, the elevator 47 is elevated and stopped at the plate cylinder supporting position Thereafter, the shaft 33a of the supporting mechanism 33 is moved leftwardly by actuation of the air cylinder 31 and is stopped at the leftmost position Then the supporting shaft 15 of the supporting mechanism 14 is moved leftwardly by actuation of the air cylinder 30, whereby the present plate cylinder 100 is disengaged from the supporting shaft 33a and the supporting shaft 15 and placed on the pallet 110.

Next, the elevator 47 is lowered and stopped at the plate cylinder conveying position. Thereafter, the truck 61 is placed at the position as shown in FIG. 1 so that the elevator 47 is aligned with the conveying mechanism 63 on the horizontal plane. In this case, the pallet 210 supporting thereon the new plate cylinder 200 is placed on the conveying mechanism 62 of the truck 61, and the conveying mechanism 63 is on standby to receive the present plate cylinder 100.

Next, the pinion 84 of the elevator 47 and the pinion 81 of the conveying mechanism 63 are rotated in a clockwise direction (FIG. 1) to thereby move the pallet 110 rightwardly. In this case, the pinion 84 of the elevator 47 is engaged with a rack of the pallet 110 supporting thereon the present plate cylinder 100, thereby moving the pallet 110 rightwardly together with the present plate cylinder 100 and conveying the pallet 110 toward the conveying mechanism 63 through the hole 67a of the transmission side frame 67. Thereafter, the pinion 81 of the conveying mechanism 63 is engaged with a rack of the pallet 110 supporting thereon the present plate cylinder 100, thereby moving further the pallet 110 rightwardly together with the present plate cylinder 100 and conveying the pallet 110 to a predetermined position on the conveying mechanism 63.

Next, the truck 61 is actuated by the hydraulic cylinder 68 and moved in the direction shown by the arrow $L_1$ in FIG. 1. The truck 61 stops at the position where the conveying mechanism 62 is aligned with the elevator 47 on the horizontal plane. Thereafter, the pinion 84 of the elevator 47 and the pinion 82 of the conveying mechanism 62 are rotated in the counterclockwise direction (FIG. 1) to move the pallet 210 leftwardly. In this case, the pinion 82 of the conveying mechanism 62 is engaged with a rack of the pallet 210 placing thereon the new plate cylinder 200, thereby moving the pallet 210 leftwardly together with the new plate cylinder 200 and conveying the pallet 210 toward the elevator 47 through the hole 67a of the transmission side frame 67. Thereafter, the pinion 84 of the elevator 47 is engaged with a rack of the pallet 210 supporting thereon the new plate cylinder 200, thereby moving further the pallet 210 leftwardly together with the new plate cylinder 200 and conveying the pallet 210 to a predetermined position on the elevator 47.

Next, the elevator 47 with the new plate cylinder 200 placed thereon is elevated and stopped at the plate supporting position. Then, the supporting shaft 33a of the supporting mechanism 33 is moved rightwardly by the hydraulic cylinder 42 and stops at a predetermined position. Incidentally, a small displacement of the supporting shaft 33a in the axial direction thereof is adjusted by the pinion 40. Thereafter, the shaft 15 of the supporting mechanism 14 is positioned at a predetermined position in the circumferential direction thereof and moved leftwardly by the air cylinder 30.

In this case, the new plate cylinder 200 is fixedly placed on the pallet 210 in such a manner that the key way 76 of the new plate cylinder 200 is aligned with the key 16 of the supporting shaft 15. Therefore, when the supporting shaft 15 is moved leftwardly, the key 16 of the supporting shaft 15 is smoothly fitted with the key way 76 of the new plate cylinder 200. Thus the new plate cylinder 200 has been supported between the supporting shaft 15 and the supporting shaft 33*a*. The elevator 47 is then lowered to the plate cylinder conveying position.

According to this embodiment of the invention, since the present plate cylinder 100 and the new plate cylinder 200 are placed in the recesses of the pallets 110 and 210 so as to fix the plate cylinders 100 and 200 stably, the pallets 110 and 210 supporting thereon the plate cylinders 110, 210 are conveyed during replacement work, the plate cylinders 100 and 200 can be quickly and reliably conveyed. Further, on the truck 61, the new plate cylinder 200 is positioned at a predetermined position in the circumferential direction with respect to the pallet 210, whereby the positioning of the new plate cylinder 200 in the circumferential direction can be easily performed with respect to the supporting mechanism 33 and the supporting mechanism 14.

As described above, according to the present invention, since the present plate cylinder and the new plate cylinder are placed on the pallets and the pallets are conveyed, the plate cylinders can be quickly and reliably conveyed during the replacement work.

Although a certain preferred embodiment of the invention has been shown and described, it should be understood that many changes and modifications can be made therein without departing from the scope of the appended claims.

What is claimed is:

1. Apparatus for changing a plate cylinder in a web-fed rotary gravure press comprising:

supporting mechanisms for detachably supporting both ends of said plate cylinder, said supporting mechanisms provided in confrontation with each other;

a palette for carrying said plate cylinder;

an elevator provided below said supporting mechanisms and having a first conveying mechanism for conveying said palette in a axial direction of said plate cylinder, said elevator being vertically movable between a first position where said plate cylinder is supported by said supporting mechanisms and a second position where said plate cylinder is conveyed in said axial direction by said conveying mechanism; and a truck provided adjacent to said elevator and being movable in a direction perpendicular to said axial direction, said truck having a pair of second conveying mechanisms parallel to each other for conveying said palette in said axial direction when said elevator is at said second position.

2. The apparatus for changing a plate cylinder in a web-fed rotary gravure press as claimed in claim 1, wherein said palette has a through hole, and said second conveying mechanism is provided with first rollers for rotating said plate cylinder in a circumferential direction thereof and second rollers for moving said plate cylinder in the axial direction thereof, said first and second rollers being vertically movable thereby to contact said plate cylinder through said through hole.

3. The apparatus for changing a plate cylinder in a web-fed rotary gravure press as claimed in claim 1, wherein said first conveying mechanism comprises a pinion which is engaged with a rack formed on said palette.

4. The apparatus for changing a plate cylinder in a web-fed rotary gravure press as claimed in claim 1, wherein said second conveying mechanism comprises a pinion which is engaged with a rack formed on said palette.

5. The apparatus for changing a plate cylinder in a web-fed rotary gravure press as claimed in claim 1, wherein said elevator is vertically movable by a lifting mechanism for moving said elevator vertically.

6. The apparatus for changing a plate cylinder in a web-fed rotary gravure press as claimed in claim 5, wherein said lifting mechanism comprises a nut provided on said elevator and a ball screw engaged with said nut.

7. The apparatus for changing a plate cylinder in a web-fed rotary gravure press as claimed in claim 5, wherein said lifting mechanism comprises a hydraulic lifter.

8. The apparatus for changing a plate cylinder in a web-fed rotary gravure press as claimed in claim 1, wherein said second conveying mechanism is provided with a key ,and said plate cylinder is formed with a key way engaged with said key, positioning of said plate cylinder in a circumferential direction being performed by said key and said key way.

* * * * *